United States Patent
Liu et al.

(10) Patent No.: US 9,454,701 B2
(45) Date of Patent: Sep. 27, 2016

(54) VIDEO SYNOPSIS METHOD AND APPARATUS

(71) Applicant: Huawei Technologies Co., Ltd., Shenzhen (CN)

(72) Inventors: Yang Liu, Beijing (CN); Xinyu Du, Beijing (CN); Dong Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 106 days.

(21) Appl. No.: 14/569,681

(22) Filed: Dec. 13, 2014

(65) Prior Publication Data

US 2015/0169962 A1    Jun. 18, 2015

(30) Foreign Application Priority Data

Dec. 13, 2013   (CN) .......................... 2013 1 0689129

(51) Int. Cl.
| | |
|---|---|
| *H04N 9/80* | (2006.01) |
| *H04N 5/93* | (2006.01) |
| *G11B 27/00* | (2006.01) |

(Continued)

(52) U.S. Cl.
CPC ..... *G06K 9/00711* (2013.01); *G06F 17/30843* (2013.01); *G06K 9/00771* (2013.01); *G06T 7/20* (2013.01); *G11B 27/034* (2013.01); *H04N 5/2625* (2013.01); *H04N 21/23418* (2013.01);
(Continued)

(58) Field of Classification Search
USPC .................................. 386/348, 278, 282–284
See application file for complete search history.

(56) References Cited

U.S. PATENT DOCUMENTS

| | | | |
|---|---|---|---|
| 8,786,781 B2* | 7/2014 | Swan ................... | G06K 9/3266 348/564 |
| 9,070,023 B2* | 6/2015 | Du ...................... | G06K 9/00369 |

(Continued)

FOREIGN PATENT DOCUMENTS

| | | |
|---|---|---|
| CN | 102930061 A | 2/2013 |
| JP | 2007237764 A | 9/2007 |

(Continued)

OTHER PUBLICATIONS

Choudhary et al., "Clustering for Multi-Perspective Video Analytics: A Soft Computing-Based Approach," Handbook on Soft Computing for Video Surveillance, C. 8, CRC Press, Boca Raton, Florida (2012).

(Continued)

*Primary Examiner* — Nigar Chowdhury
(74) *Attorney, Agent, or Firm* — Leydig, Voit & Mayer, Ltd.

(57) ABSTRACT

Embodiments of the present invention provide a video synopsis method and apparatus, and relate to the field of video synopsis. The method includes: extracting moving objects and moving tracks of the moving objects from an original video; calculating a spatio-temporal redundancy between the extracted moving tracks, and determining a synopsis ratio of the moving tracks according to the spatio-temporal redundancy; and changing rates of the moving tracks according to the synopsis ratio of the moving tracks. In the present invention, the spatio-temporal redundancy between the moving tracks is analyzed, and synopsis and rate changing are performed on corresponding tracks according to the spatio-temporal redundancy obtained by means of analysis to obtain different representations of different tracks, thereby improving user experience.

19 Claims, 4 Drawing Sheets

(51) Int. Cl.

| | |
|---|---|
| *G06K 9/00* | (2006.01) |
| *H04N 21/8549* | (2011.01) |
| *G06F 17/30* | (2006.01) |
| *G06T 7/20* | (2006.01) |
| *G11B 27/034* | (2006.01) |
| *H04N 5/262* | (2006.01) |
| *H04N 21/234* | (2011.01) |

(52) U.S. Cl.
CPC . *H04N 21/8549* (2013.01); *G06T 2207/10016* (2013.01); *G06T 2207/30232* (2013.01)

(56) References Cited

U.S. PATENT DOCUMENTS

| | | |
|---|---|---|
| 2008/0304706 A1 | 12/2008 | Akisada et al. |
| 2010/0092037 A1 | 4/2010 | Peleg et al. |
| 2010/0318546 A1 | 12/2010 | Kenthapadi et al. |
| 2012/0092446 A1 | 4/2012 | Peleg et al. |

FOREIGN PATENT DOCUMENTS

| | | |
|---|---|---|
| JP | 2008306604 A | 12/2008 |
| JP | 2011186727 A | 9/2011 |
| KR | 20080082963 A | 9/2008 |
| WO | WO 2007057893 A2 | 5/2007 |

OTHER PUBLICATIONS

Sun et al., "A Tracking Based Fast Online Complete Video Synopsis Approach," 21$^{st}$ International Conference on Pattern Recognition, Tsukuba, Japan, pp. 1956-1959, Institute of Electrical and Electronics Engineers, New York, New York (Nov. 11-15, 2012).

A. Rav-Acha, et al., Making a Long Video Short: Dynamic Video Synopsis, CVPR'06, Jun. 2006, pp. 435-441.†

\* cited by examiner
† cited by third party

VIDEO SYNOPSIS METHOD AND APPARATUS

CROSS-REFERENCE TO RELATED APPLICATIONS

This application claims priority to Chinese Patent Application No. 201310689129.3, filed with the Chinese Patent Office on Dec. 13, 2013, which is incorporated herein by reference in its entirety.

TECHNICAL FIELD

The present invention relates to the video field, and in particular, to a video synopsis method and apparatus.

BACKGROUND

In the field of social public security, a video surveillance system is an important part of maintaining social order and strengthening public administration. At present, surveillance systems have been widely applied to public places such as a bank, a shopping mall, a bus station, an underground parking lot, and a traffic intersection. Much manual support is still needed in a real-life surveillance task. A surveillance camera generates a large amount of video data when performing continuous monitoring in 24 hours per day. In this case, when it is required to search for evidence from a surveillance video, it will inevitably consume a large amount of labor, time, and material resources, which causes an extremely low efficiency and even leads to a miss of a best opportunity to solve a case. Therefore, in the video surveillance system, a playback time of a video event is shortened by synopsizing the video, and an object to be retrieved may be quickly browsed and locked by classifying objects for filtering, thereby greatly improving surveillance efficiency, which is of vital importance in helping, for example, the police, to accelerate the process of solving a case and improve efficiency in solving major and serious cases which are more complex. The prior art provides a video synopsis method. By analyzing scene information in an input video stream and extracting foreground information from the scene information, object information in the scene information is obtained by performing a cluster analysis of the acquired foreground information, and further a corresponding synopsized video is generated. In the generated synopsized video, a single frame of image includes object information acquired in different frames in the input video. The prior art performs synopsis in a unit of frame, causing that a synopsized video is displayed in a single manner, and different representations of different tracks cannot be reflected.

SUMMARY

To solve a problem that a synopsized video is displayed in a single manner, a video synopsis method and apparatus are provided in embodiments of the present invention. Technical solutions are as follows:

According to a first aspect, the present invention provides a video synopsis method, and the method includes the following steps:

extracting at least two moving objects and moving tracks of the at least two moving objects from an original video;

calculating a spatio-temporal redundancy between the at least two moving tracks, and determining a synopsis ratio of the moving tracks according to the spatio-temporal redundancy; and synopsizing the moving tracks of the moving objects according to the synopsis ratio of the moving tracks.

With reference to the first aspect, in a first possible implementation manner of the first aspect, the original video includes at least one video segment, and before the calculating a spatio-temporal redundancy between the at least two moving tracks, and determining a synopsis ratio of the moving tracks according to the spatio-temporal redundancy, the method further includes:

acquiring, from the at least one video segment, one or more time coordinate values corresponding to time points of start frames and end frames of the moving objects, and spatial coordinate values passed by the moving tracks of the moving objects; and the calculating a spatio-temporal redundancy between the at least two moving tracks, and determining a synopsis ratio of the moving tracks according to the spatio-temporal redundancy specifically includes:

calculating a temporal collision probability between the moving objects according to the time coordinate values corresponding to the start frames and the end frames of the moving objects;

calculating a spatial crossover probability between the moving tracks according to the spatial coordinate values passed by the moving tracks of the moving objects;

obtaining the spatio-temporal redundancy of the moving tracks according to the temporal collision probability and the spatial crossover probability; and determining the synopsis ratio of the moving tracks according to the spatio-temporal redundancy.

With reference to the first possible implementation manner of the first aspect, in a second possible implementation manner of the first aspect, the method includes:

obtaining by calculation the temporal collision probability by using the following formula:

$$Pt_{i,n}(f) = 1 - \frac{\text{lifetime of an } n^{th} \text{ object on an } i^{th} \text{ track within an } f \text{ video segment}}{\text{lifetimes of all objects on the } i^{th} \text{ track within the } f \text{ video segment}}; \quad (1)$$

obtaining by calculation the spatial crossover probability by using the following formula:

$$Pd_{i,n}(f) = \frac{\text{the number of tracks crossing an } i^{th} \text{ track within an } f \text{ video segment}}{\text{the number of tracks within the } f \text{ video segment}}; \quad (2)$$

obtaining by calculation the total spatio-temporal crossover and collision probability by using the following formula:

$$P_{i,n}^{cross-impact}(f) = W(f) \times (Pd_{i,n}(f) + Pt_{i,n}(f)); \quad (3)$$

obtaining by calculation the spatio-temporal redundancy by using the following formula:

$$O_{i,n}(f) = 1 - P_{i,n}^{cross-impact}(f); \quad (4)$$

where f indicates an $f^{th}$ video segment obtained after the original video is segmented by time or frame; $t_{i,n}$ indicates a movement time period of an $n^{th}$ moving object on an $i^{th}$ moving track within the $f^{th}$ video segment, where the $t_{i,n}$ is less than or equal to a lifetime of the $n^{th}$ moving object, and the lifetime is a time period between a time point of a start frame and a time point of an end frame of the moving object; and W(f) indicates a sensitivity adjustment function of the temporal collision probability and the spatial crossover probability.

With reference to the first aspect and either the first possible implementation manner of the first aspect or the second possible implementation manner of the first aspect, in a third possible implementation manner of the first aspect, the synopsizing the moving tracks of the moving objects according to the synopsis ratio of the moving tracks includes:

keeping frames of the moving tracks unchanged and changing original frame rates of the moving tracks, according to the synopsis ratio of the moving tracks; or keeping original frame rates of the moving tracks unchanged and reducing frames of the moving tracks, according to the synopsis ratio of the moving tracks; or reducing frames of the moving tracks and changing original frame rates of the moving tracks, according to the synopsis ratio of the moving tracks.

With reference to the third possible implementation manner of the first aspect, in a fourth possible implementation manner of the first aspect, the keeping frames of the moving tracks unchanged and changing original frame rates of the moving tracks, according to the synopsis ratio of the moving tracks includes:

obtaining change values of frame rates of the moving tracks according to the synopsis ratio of the moving tracks, and performing an acceleration on the moving tracks by increasing the frame rates according to the change values of the frame rates.

With reference to the fourth possible implementation manner of the first aspect, in a fifth possible implementation manner of the first aspect, the keeping original frame rates of the moving tracks unchanged and reducing frames of the moving tracks, according to the synopsis ratio of the moving tracks includes:

obtaining change values of the frames of the moving tracks according to the synopsis ratio of the moving tracks, and performing an acceleration on the moving tracks by reducing the frames according to the change values of the frames.

With reference to the fifth possible implementation manner of the first aspect, in a sixth possible implementation manner of the first aspect, the reducing frames of the moving tracks and changing original frame rates of the moving tracks, according to the synopsis ratio of the moving tracks includes:

obtaining change values of frame rates and change values of the frames of the moving tracks according to the synopsis ratio of the moving tracks, and performing an acceleration on the moving tracks by changing the frame rates and reduce the frames according to the change values of the frame rates and the change values of the frames.

With reference to the first aspect, or any one of the first possible implementation manner to the sixth possible implementation manner of the first aspect, in a seventh possible implementation manner of the first aspect, after the synopsizing the moving tracks of the moving objects according to the synopsis ratio of the moving tracks, the method further includes:

setting an area of interest, and performing customized rate changing, within a value range of the synopsis ratio, on a moving track in the area of interest; or changing rates of the moving tracks of the moving objects according to the synopsis ratio.

According to a second aspect, an embodiment of the present invention provides a video synopsis apparatus, and the apparatus includes:

an extracting unit, configured to extract at least two moving objects and moving tracks of the at least two moving objects from an original video;

a calculating unit, configured to calculate a spatio-temporal redundancy between the at least two moving tracks extracted by the extracting unit, and determine a synopsis ratio of the moving tracks according to the spatio-temporal redundancy; and a synopsizing unit, configured to synopsize the moving tracks of the moving objects according to the synopsis ratio of the moving tracks that is determined by the calculating unit.

With reference to the second aspect, in a first possible implementation manner of the second aspect, the original video includes at least one video segment; the extracting unit is configured to acquire time coordinate values corresponding to start frames and end frames of the moving objects, and spatial coordinate values passed by the moving tracks of the moving objects; and the calculating unit further includes:

a temporal collision probability calculating subunit, configured to calculate a temporal collision probability between the moving objects according to the time coordinate values corresponding to the start frames and the end frames of the moving objects;

a spatial crossover probability calculating subunit, configured to calculate a spatial crossover probability between the moving tracks according to the spatial coordinate values passed by the moving tracks of the moving objects;

a spatio-temporal redundancy acquiring subunit, configured to obtain the spatio-temporal redundancy of the moving tracks according to the temporal collision probability and the spatial crossover probability; and a synopsis ratio acquiring subunit, configured to determine the synopsis ratio of the moving tracks according to the spatio-temporal redundancy.

With reference to the first possible implementation manner of the second aspect, in a second possible implementation manner of the second aspect, the temporal collision probability calculating subunit calculates the temporal collision probability between the moving objects by using the following formula:

$$Pt_{i,n}(f) = 1 - \frac{\text{lifetime of an } n^{th} \text{ object on an } i^{th} \text{ track within an } f \text{ video segment}}{\text{lifetimes of all objects on the } i^{th} \text{ track within the } f \text{ video segment}}; \quad (1)$$

the spatial crossover probability calculating subunit calculates the spatial crossover probability between the moving objects by using the following formula:

$$Pd_{i,n}(f) = \frac{\text{the number of tracks crossing an } i^{th} \text{ track within an } f \text{ video segment}}{\text{the number of tracks within the } f \text{ video segment}}; \quad (2)$$

the spatio-temporal redundancy acquiring subunit includes:

a total spatio-temporal crossover and collision probability calculating secondary subunit, calculating a total spatio-temporal crossover and collision probability between the moving tracks by using the following formula:

$$P_{i,n}^{cross-impact}(f) = W(f) \times (Pd_{i,n}(f) + Pt_{i,n}(f)) \quad (3)$$

the spatio-temporal redundancy acquiring secondary subunit, calculating the spatio-temporal redundancy between the moving tracks by using the following formula:

$$O_{i,n}(f) = 1 - P_{i,n}^{cross-impact}(f); \quad (4)$$

where f indicates an $f^{th}$ video segment obtained after the original video is segmented by time or frame; $t_{i,n}$ indicates a movement time period of an $n^{th}$ moving object on an $i^{th}$ moving track within the $f^{th}$ video segment, where the $t_{i,n}$ is less than or equal to a lifetime of the $n^{th}$ moving object, and the lifetime is a time period between a time point of a start frame and a time point of an end frame of the moving object; and W(f) indicates a sensitivity adjustment function of the temporal collision probability and the spatial crossover probability.

With reference to the second aspect, the first possible implementation manner of the second aspect, and the second possible implementation manner of the second aspect, in a third possible implementation manner of the second aspect, the synopsizing unit includes:

a first rate-changing subunit, configured to keep frames of the moving tracks unchanged and change original frame rates of the moving tracks, according to the synopsis ratio of the moving tracks; or a second rate-changing subunit, configured to keep original frame rates of the moving tracks unchanged and reduce frames of the moving tracks, according to the synopsis ratio of the moving tracks; or a third rate-changing subunit, configured to reduce frames of the moving tracks and change original frame rates of the moving tracks, according to the synopsis ratio of the moving tracks.

With reference to the third possible implementation manner of the second aspect, in a fourth possible implementation manner of the second aspect, the first rate-changing subunit is specifically configured to obtain change values of frame rates of the moving tracks according to the synopsis ratio of the moving tracks, and perform an acceleration on the moving tracks by increasing the frame rates according to the change values of the frame rates.

With reference to the fourth possible implementation manner of the second aspect, in a fifth possible implementation manner of the second aspect, the second rate-changing subunit is specifically configured to obtain change values of the frames of the moving tracks according to the synopsis ratio of the moving tracks, and perform an acceleration on the moving tracks by reducing the frames according to the change values of the frames.

With reference to the fifth possible implementation manner of the second aspect, in a sixth possible implementation manner of the second aspect, the third rate-changing subunit is specifically configured to obtain change values of frame rates and change values of the frames of the moving tracks according to the synopsis ratio of the moving tracks, and perform an acceleration on the moving tracks by changing the frame rates and reducing the frames, according to the change values of the frame rates and the change values of the frames.

With reference to any one of the first to the sixth possible implementation manners of the second aspect, in a seventh possible implementation manner of the second aspect, the apparatus further includes:

a customized rate-changing subunit, configured to perform customized rate changing, by setting an area of interest, within a value range of the synopsis ratio, on a moving track in the area of interest; or an automatic rate-changing subunit, configured to change rates of the moving tracks of the moving objects according to the synopsis ratio.

According to a video synopsis method and apparatus provided in the embodiments of the present invention, moving objects and moving tracks are extracted from an original video, and a spatio-temporal redundancy between the tracks is calculated. That is, the spatio-temporal redundancy between the moving tracks is obtained based on an overlapping probability, in time and space, of the moving tracks. Therefore, synopsis ratios of different moving tracks are obtained separately, and rates of the different moving tracks are changed separately according to the different synopsis ratios, thereby reflecting different representations of the different tracks and diversifying display manners of a synopsis result. Further optionally, based on the foregoing description, by setting an area of interest for a user, a rate of an object or an area that the user is interested in may be reduced, thereby enabling the user to make a full observation and ensuring information integrity of a track of an object.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Embodiment 1

Figure 1:
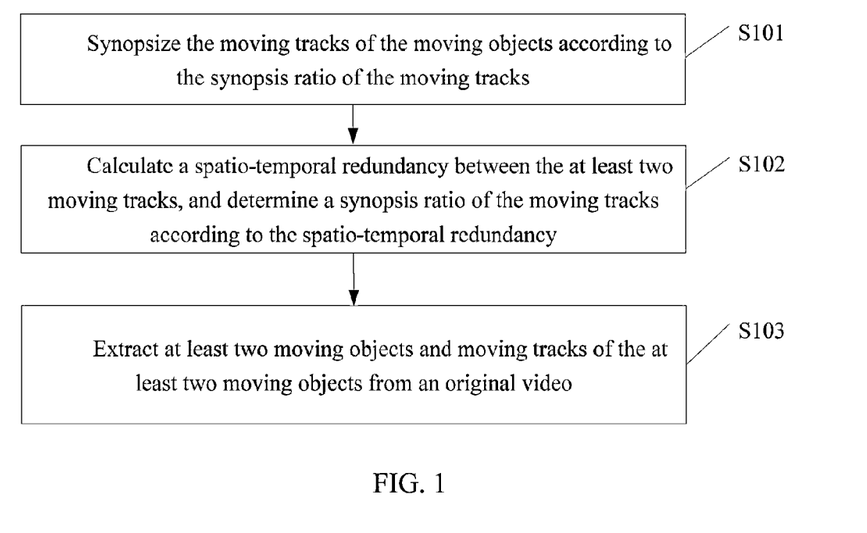
FIG. 1 is a flowchart of a video synopsis method according to Embodiment 1 of the present invention.

As shown in FIG. 1, this embodiment of the present invention provides a video synopsis method, and the method includes the following steps:

S101. Extract at least two moving objects and moving tracks of the at least two moving objects from an original video.

In a specific application scenario, extracting the moving objects and the moving tracks of the moving objects from the original video relates to a moving object segmentation technology. That is, a foreground and a background of the video are segmented. Separating a foreground from a background in a video facilitates independent processing of the foreground or the background. The foreground herein refers to a moving object and a track of the moving object, and the background herein refers to an object that is not a moving object or a track of the moving object. After the foreground is separated from the background, the obtained background may be processed in various ways, such as background light strengthening and background identification. After the background is processed, the foreground, that is, the moving object and the track of the moving object, may be added, and this is independent processing of the background. Similarly, after the foreground is separated from the background, it may also be that the foreground, that is, the moving object and the track of the moving object, is processed independently, and then the background is added. In the technical solutions provided in this embodiment, after a foreground obtained by means of segmentation, that is, a moving object and a track of the moving object, is processed independently, a different moving object and a track of the different moving object are superposed layer by layer.

However, before moving object segmentation is implemented, moving object detection and tracking need to be performed first, so as to obtain a moving object and a track of the moving object. In a specific implementation process, there are many methods that may be used to implement moving object detection and tracking, and technologies of moving object detection and moving object tracking are combined to extract a moving object and a moving track of the moving object. For example, a frame difference method and a background modeling method may be used in moving object detection. Tracking technologies such as a mean shift (mean shift) method and a long term tracking algorithm (long term tracking,) may be used in moving object tracking. By extracting the moving objects and the moving tracks of the moving objects from the original video, time coordinates corresponding to time points of start frames and end frames of the moving objects, and a series of spatial coordinates passed by the moving tracks is obtained.

S102. Calculate a spatio-temporal redundancy between the at least two moving tracks, and determine a synopsis ratio of the moving tracks according to the spatio-temporal redundancy.

According to the different moving objects and the moving tracks of the different moving objects that are obtained from the original video in step S101, a temporal collision probability of the tracks is obtained according to a probability that time coordinates corresponding to time points of a start frame and an end frame of a moving object on one of the moving tracks overlap with time coordinates corresponding to time points of start frames and end frames of other moving objects. The temporal collision probability is a probability that a lifetime of a moving object on a moving track overlaps with lifetimes of other moving objects on the moving track, where the lifetime of the moving object is obtained according to time points of a start frame and an end frame of the moving object.

According to the different moving objects and the moving tracks of the different moving objects that are obtained from the original video in step S101, a spatial crossover probability of the tracks is obtained according to a probability that a series of spatial coordinates obtained on a track passed in space by one of the moving objects overlaps with a series of spatial coordinates obtained on tracks passed in space by other moving objects. The spatial crossover probability is a probability that a moving object on a moving track crosses other moving tracks.

That is, the temporal collision probability is analyzed based on one moving track in a case in which a temporal collision occurs among multiple moving objects on the moving track. When only one moving object exists on the moving track, the temporal collision probability is zero. The spatial crossover probability is analyzed based on different moving tracks in a case in which a spatial crossover occurs among the different moving tracks. When all moving objects share one moving track, the spatial crossover probability is zero.

A spatial crossover probability and a temporal collision probability that are obtained based on a same moving object are independent of each other. A total spatio-temporal crossover and collision probability of a moving track may be obtained by combining the two independent probabilities. The total spatio-temporal crossover and collision probability may be used to estimate/acquire a relative spatio-temporal redundancy that exists between the moving track and other moving tracks, that is, a ratio of frames which can be synopsized to total frames, that is, a relative synopsis ratio of the moving track. The synopsis ratio is a ratio of the amount of data contained in a synopsized video to the amount of data contained in the original video.

S103. Synopsize the moving tracks of the moving objects according to the synopsis ratio of the moving tracks.

According to the synopsis ratio of the moving tracks that is obtained in S102, that is, the ratio of the frames which can be synopsized to the total frames, rates of the moving tracks are changed. Specifically, a larger spatio-temporal redundancy indicates a larger synopsis ratio of the tracks. By separately analyzing different moving tracks of moving objects to acquire different synopsis ratios of the different moving tracks, it may be implemented that rates of the different moving tracks are separately changed according to the synopsis ratios of the different moving tracks; at least a movement rate of one moving object relative to other moving objects is changed; and spatial positions and rate-changing speeds of rate-changeable moving tracks are obtained.

In this embodiment of the present invention, a spatio-temporal redundancy between moving tracks is obtained based on an overlapping probability, in time and space, of the moving tracks. Therefore, synopsis ratios of different moving tracks are obtained separately, and rates of the different moving tracks are changed separately according to the different synopsis ratios, thereby reflecting different representations of the different tracks and diversifying display manners of a synopsis result. By using a specific instance, the following describes the video synopsis method based on temporal compression of tracks provided in the present invention.

A specific implementation process of step S101 in the video synopsis method based on the temporal compression of tracks in the present invention may include the following.

In a specific implementation process, extracting the moving objects and the moving tracks from the entire original video may obtain a large number of moving objects and moving tracks at a time. This problem is more evident especially with a surveillance video in the downtown in which a large number of people and vehicles exist. Therefore, as an optional implementation manner, the foregoing extracting the moving objects and the moving tracks of the moving objects from the original video may includes the following steps:

a. Perform segmentation on the original video to obtain at least two video segments.

Optionally, the segmentation may be based on time or in other manners. In addition, different segmentation manners may be selected for surveillance videos in different environments. For example, for a surveillance video in the downtown in which multifarious moving objects exist, a segment length selected during segmentation may be relatively short. In this way, moving objects and tracks of the moving objects that are obtained at a time are within a relatively proper range, and an analysis of a spatio-temporal redundancy within this period of time is more accurate and an obtained effect is clearer, thereby facilitating a viewer's watching.

b. Select any video segment from the at least two video segments and extract moving objects and moving tracks of the moving objects from the video segment.

A specific implementation process of step S102 in the video synopsis method based on the temporal compression of tracks in the present invention is as follows:

According to the segmentation of the original video and the different moving objects and the moving tracks that are obtained from one video segment in the foregoing steps, a temporal collision probability of the tracks is obtained according to a probability that time coordinates corresponding to time points of a start frame and an end frame of a moving object on a moving track in the video segment overlap with time coordinates corresponding to time points of start frames and end frames of other moving objects in the video segment. The temporal collision probability is a probability that a lifetime of a moving object on a moving track overlaps with lifetimes of other moving objects on the moving track, where the lifetime of the moving object is obtained according to time points of a start frame and an end frame of the moving object;

According to the segmentation of the original video and the different moving objects and the moving tracks that are obtained from one video segment in the foregoing steps, a spatial crossover probability of the tracks is obtained according to a probability that a series of spatial coordinates obtained on a track passed in space by a moving object in the video segment overlaps with a series of spatial coordinates obtained on tracks passed in space by other moving objects in the video segment. The spatial crossover probability is a probability that a moving object on a moving track crosses other moving tracks.

A spatial crossover probability and a temporal collision probability that are obtained based on a same moving object in a same video segment are independent of each other. A total spatio-temporal crossover and collision probability of the moving track may be obtained by combining the two independent probabilities. The total spatio-temporal crossover and collision probability is a relative spatio-temporal redundancy that exists between the moving track and other moving tracks, that is, a ratio of frames which can be synopsized to total frames, that is, a relative synopsis ratio of the moving track.

Specifically, Track($t_{i,n}$,i,n) is used to indicate a moving track in a video segment (an $f^{th}$ video segment), that is, a track that an $n^{th}$ object on an $i^{th}$ moving track passes in a $t_{i,n}$ period; $Pd_{i,n}(f)$ is used to indicate a probability that other moving tracks except the $i^{th}$ track cross the $n^{th}$ object on the $i^{th}$ track within the $f^{th}$ video segment, that is, a spatial crossover probability; and $Pt_{i,n}(f)$ is used to indicate a probability that moving objects, which appear during periods except the $t_{i,n}$ period in the original video segment that contains the $i^{th}$ track, collide with the $n^{th}$ object on the $i^{th}$ track during the $t_{i,n}$ period, that is, a temporal collision probability.

Specifically, the calculating a spatio-temporal redundancy between the at least two moving tracks, and determining a synopsis ratio of the moving tracks according to the spatio-temporal redundancy may include the following.

Figure 2:
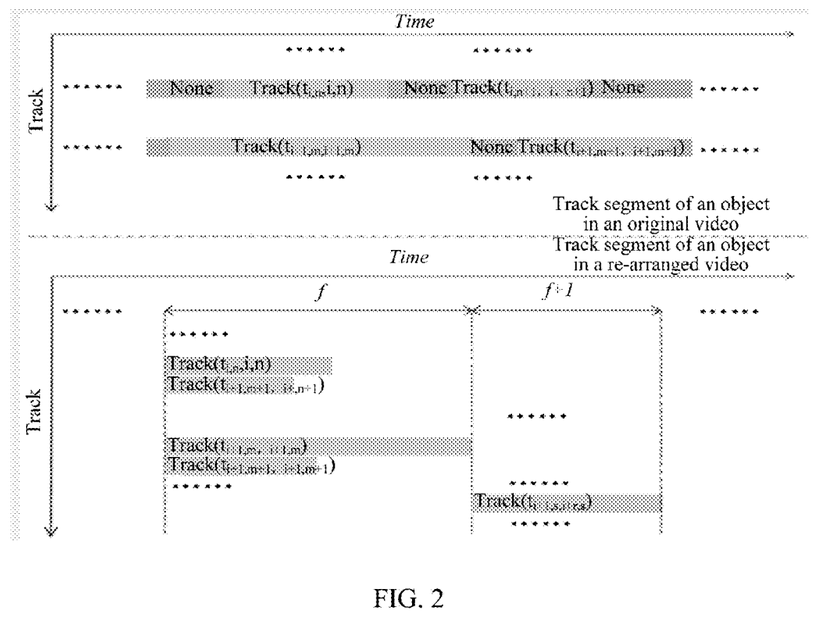
FIG. 2 is an implementation diagram of re-shooting an original video by segment in the video synopsis method according to Embodiment 1 of the present invention.

As shown in FIG. 2, tracks of all objects in any video segment (the $f^{th}$ video segment is used as an example) are aligned at start time after the original video is segmented, and the spatio-temporal redundancy of the extracted moving tracks is calculated by using the following formulas:

A spatial crossover is a case in which different moving tracks cross each other in space, and the spatial crossover probability may be specifically represented as:

$$Pd_{i,n}(f) = \frac{\text{the number of tracks crossing an } i^{th} \text{ track within an } f^{th} \text{ video segment}}{\text{the number of tracks within the } f^{th} \text{ video segment}}$$

Because different moving tracks only cross each other in space but do not collide with each other in time, a temporal collision is a case in which different moving objects on a same moving track collide with each other, and the temporal collision probability may be specifically represented as:

$$Pt_{i,n}(f) = 1 - \frac{\text{lifetime of an } n^{th} \text{ object on an } i^{th} \text{ track within an } f^{th} \text{ video segment}}{\text{lifetimes of all objects on the } i^{th} \text{ track within the } f^{th} \text{ video segment}},$$

where f indicates the $f^{th}$ video segment obtained after the original video is segmented by time or frame; $t_{i,n}$ indicates a movement time period of an $n^{th}$ moving object on an $i^{th}$ moving track within the $f^{th}$ video segment, where the $t_{i,n}$ is less than or equal to a lifetime of the $n^{th}$ moving object, lifetimes of all objects on the $i^{th}$ track within the $f^{th}$ video segment are the sum of the lifetimes of the all objects on the $i^{th}$ track within the $f^{th}$ video segment, and the lifetime is a time period between a time point of a start frame and a time point of an end frame of the moving object. Items in the foregoing formulas may be obtained from time coordinates and spatial coordinates within a lifetime of a moving track in the original video in S101, and because the foregoing two probabilities are independent of each other, for a track Track($t_{i,n}$,i,n), a total crossover and collision probability is:

$$P_{i,n}^{cross-impact}(f) = W(f) \times (Pd_{i,n}(f) + Pt_{i,n}(f))$$

In conclusion, the following trajectory optimization function may be set, so as to indicate a spatio-temporal redundancy of the track Track($t_{i,n}$,i,n):

$$O_{i,n}(f) = 1 - P_{i,n}^{cross-impact}(f),$$

W(f) indicates a sensitivity adjustment function of the temporal collision probability and the spatial crossover probability, and the function may be set to a non-increasing function of the number of tracks within the $f^{th}$ video segment. For example, a value of the W(f) may be 0.5 or may be greater than 0 and less than 1, which is an empirical value, and the W(f) is adjustable with an adjustable range greater than 0 and less than 1. Obviously, a larger spatio-temporal redundancy $O_{i,n}(f)$ indicates a larger synopsis extent of the track Track($t_{i,n}$,i,n), that is, a larger synopsis ratio, because a value of the spatio-temporal redundancy $O_{i,n}(f)$ is a value of the synopsis ratio.

Then, the synopsis ratio of the moving tracks is determined according to the spatio-temporal redundancy.

According to the synopsis ratio of the moving tracks that is obtained in the foregoing steps, that is, the ratio of the frames which can be synopsized to the total frames, specifically, a larger spatio-temporal redundancy indicates a larger synopsis ratio of the tracks. According to synopsis ratios of different moving tracks, rates of the different moving tracks are separately changed; at least a movement rate of a moving object relative to other moving objects is changed; and spatial positions and rate-changing speeds of rate-changeable moving tracks are obtained. In a specific implementation process, changing the rates of the moving tracks may be implemented by using at least the following approaches: 1) Change an original display frame rate. That is, a display frame rate is not consistent with a display frame rate of the original video, which may be classified into two situations: a. Increase a frame rate. That is, on a premise that the display frame rate is higher than the display frame rate of the original video, in this case, an acceleration may be performed by further increase display rates of the tracks by keeping frames of the tracks unchanged or reducing frames of a specified track; and a deceleration may be implemented by increasing the frames of the specified track; b. Reduce the frame rate. That is, on a premise that the display frame rate is lower than the display frame rate of the original video, in this case, an acceleration may be implemented by reducing the frames of the tracks; and a deceleration may be implemented by keeping the frames of the tracks unchanged or increasing frames of a specified track; 2) Keep the original display frame rate. That is, on a premise that the display frame rate keeps consistent with the display frame rate of the original video, an acceleration in a display rate of a specified track may be implemented by reducing frames of the specified track; and a deceleration in the display rate of the specified track may be implemented by increasing the frames of the tracks.

As an optional implementation manner, based on the foregoing approaches 1) of changing the rates of the moving tracks, the frames of the moving tracks are kept unchanged; original frame rates of the moving tracks are changed; change values of frame rates of the moving tracks may be obtained according to the synopsis ratio of the moving tracks; and an acceleration is performed on the moving tracks by increasing the frame rates according to the change values of the frame rates. Specifically, the synopsis ratio of the moving tracks is in direct proportion to the change values of the frame rates of the moving tracks. That is, on a basis of the original frame rates, a larger synopsis ratio indicates a larger change of the frame rate, and a smaller synopsis ratio indicates a smaller change of the frame rate. The premise is that rate changes are all accelerations based on the original frame rates, with an only difference in acceleration amplitude.

As another optional implementation manner, based on the foregoing approaches 2) of changing the rates of the moving tracks, original frame rates of the moving tracks are kept unchanged; the frames of the moving tracks are reduced; change values of the frames of the moving tracks may be obtained according to the synopsis ratio of the moving tracks; and an acceleration is performed on the moving tracks by reducing the frames according to the change values of the frames. Specifically, the synopsis ratio of the moving tracks is in direct proportion to the change values of the frames of the moving tracks. That is, on a basis of original frames, a larger synopsis ratio indicates a larger change of the frames, and a smaller synopsis ratio indicates a smaller change of the frames. The premise is that frame changes are all decreases based on the original frames, with an only difference in decrease amplitude.

As yet another optional implementation manner, based on the foregoing approaches 1) of changing the rates of the moving tracks, the frames of the moving tracks are reduced and original frame rates of the moving tracks are changed; change values of frame rates and change values of the frames of the moving tracks may be obtained according to the synopsis ratio of the moving tracks; and an acceleration is performed on the moving tracks by changing the frame rates according to the change values of the frame rates, and an acceleration is performed on the moving tracks by reducing the frames according to the change values of the frames. Specifically, the synopsis ratio of the moving tracks is in direct proportion to the change values of the frame rates of the moving tracks, and the synopsis ratio of the moving tracks is in direct proportion to the change values of the frames of the moving tracks. That is, on a basis of the original frame rates, a larger synopsis ratio indicates a larger change of the frame rate, and a smaller synopsis ratio indicates a smaller change of the frame rate. The premise is that rate changes are all accelerations based on the original frame rates, with an only difference in acceleration amplitude difference. In addition, on a basis of original frames, a larger synopsis ratio indicates a larger change of the frames, and a smaller synopsis ratio indicates a smaller change of the frames. The premise is that frame changes are all decreases based on the original frames, with an only difference in decrease amplitude.

Based on any one of the foregoing implementation manners, optionally, a user may set an area of interest in a synopsized video. For example, in a real environment, police may be interested in one or more objects when watching the synopsized video. In this case, to slow down a playback rate of objects of interest, customized rate changing may be performed on moving tracks of the one or more objects of interest. That is, an adjustment is performed between a display rate of the original video and a display rate of the synopsized video. In this case, other moving tracks may still be synopsized to a greatest extent according to synopsis ratios of the other moving tracks. That is, other moving objects move at a relatively fast rate. In this implementation manner, by performing a deceleration on the area of interest, the area of interest thereby acquires a better dynamic detail display effect. As described in the foregoing, specific deceleration solutions may be implemented by reducing the display frame rate or increasing the frames.

Optionally, the user may also not set the area of interest. In this case, all moving tracks are synopsized according to a synopsis ratio obtained according to a corresponding spatio-temporal redundancy of the moving tracks. That is, all moving objects move at a relatively fastest rate. That is, display rates of different tracks are adjusted according to different synopsis ratios, so that on a premise that an evenness effect of spatio-temporal display is ensured, it is implemented that display time of a video synopsis result is compressed intelligently and effectively.

A spatio-temporal redundancy of moving tracks is obtained based on an overlapping probability, in time and space, of the moving tracks in this embodiment of the present invention. Therefore, synopsis ratios of different moving tracks are obtained separately, and rates of the different moving tracks are changed separately according to the different synopsis ratios, thereby reflecting different representations of the different tracks and diversifying display manners of a synopsis result. In addition, by further performing a deceleration on an object or an area that a user is interested in, the user may make a full observation, thereby ensuring information integrity of a track of an object.

Embodiment 2

Figure 3:
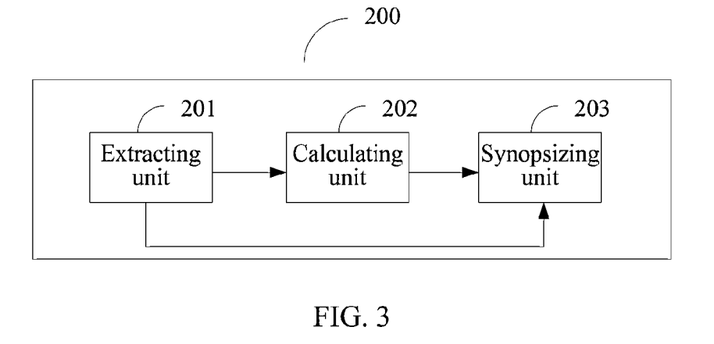
FIG. 3 is a structural block diagram of a video synopsis apparatus according to Embodiment 2 of the present invention.

As shown in FIG. 3, this embodiment of the present invention provides a video synopsis apparatus 200, and the apparatus includes:

an extracting unit 201, configured to extract at least two moving objects and moving tracks of the at least two moving objects from an original video;

a calculating unit 202, configured to calculate a spatio-temporal redundancy between the at least two moving tracks extracted by the extracting unit, and determine a synopsis ratio of the moving tracks according to the spatio-temporal redundancy; and a synopsizing unit 203, configured to synopsize the moving tracks of the moving objects according to the synopsis ratio, determined by the calculating unit 202, of the moving tracks.

In a specific application scenario, extracting the moving objects and the moving tracks of the moving objects from the original video by the extracting unit 201 relate to a moving object segmentation technology. That is, a foreground and a background of the video are segmented. Separating a foreground from a background in a video facilitates independent process of the foreground or the background. The foreground herein refers to a moving object and a track of the moving object, and the background herein refers to an object that is not a moving object or a track of the moving object. After the foreground is separated from the background, the obtained background may be processed in various ways, such as background light strengthening and background identification. After the background is processed, the foreground, that is, the moving object and the track of the moving object, may be added, and this is independent processing of the background. Similarly, after the foreground is separated from the background, it may also be that the foreground, that is, the moving object and the track of the moving object, is processed independently, and then the foreground is added. In the technical solutions provided in this embodiment, after a foreground obtained by approaches of segmentation, that is, a moving object and a track of the moving object, is processed independently, a different moving object and a track of the different moving object are superposed layer by layer.

However, before moving object segmentation is implemented, moving object detection and tracking need to be performed first, so as to obtain a moving object and a track of the moving object. In a specific implementation process, there are many methods that may be used to implement moving object detection and tracking, and technologies of moving object detection and moving object tracking are combined to acquire a moving track, thereby extracting a moving object and a moving track of the moving object. For example, a frame difference method and a background modeling method may be used in moving object detection. Tracking technologies such as a mean shift (mean shift) method and a long term tracking algorithm (long term tracking, TLD) may be used in moving object tracking. By extracting the moving objects and the moving tracks of the moving objects from the original video, time coordinates corresponding to time points of start frames and end frames of the moving objects, and a series of spatial coordinates passed by the moving tracks is obtained.

In a specific implementation process, extracting the moving objects and the moving tracks from the entire original video may obtain a large number of moving objects and moving tracks at a time. This problem is more evident especially with a surveillance video in the downtown in which a large number of people and vehicles exist. Therefore, as an optional implementation manner, the extracting unit 201 may be configured to obtain at least two video segments after segmenting the original video by time or frame.

The extracting unit 201 is configured to select one video segment from the at least two video segments and extract the moving objects and the moving tracks of the moving objects from the video segment.

Specifically, the original video may be segmented based on time or other manners. In addition, different segmentation manners may be selected for surveillance videos in different environments. For example, for a surveillance video in the downtown in which multifarious moving objects exist, a segment length selected during segmentation may be relatively short. In this way, moving objects and tracks of the moving objects that are obtained at a time are within a relatively proper range, and an analysis of a spatio-temporal redundancy within this period of time is more accurate and an obtained effect is clearer, thereby facilitating a viewer's watching.

Optionally, the extracting unit 201 is further configured to acquire time coordinate values corresponding to the start frames and the end frames of the extracted moving objects, and spatial coordinate values passed by the moving tracks of the moving objects.

Figure 4:
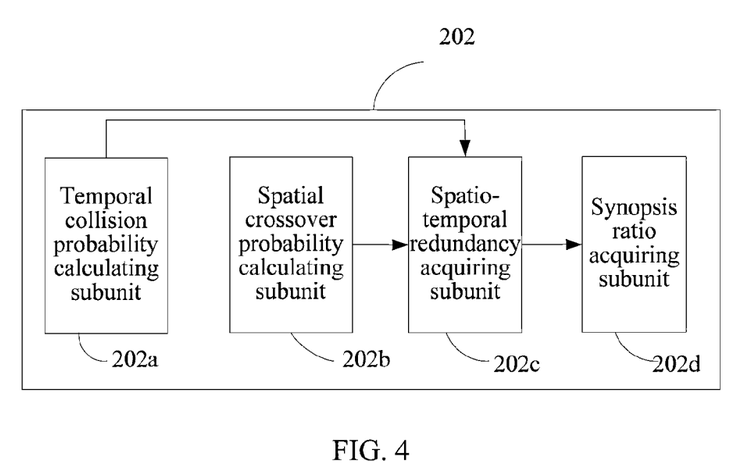
FIG. 4 is a structural block diagram of a calculating unit in the video synopsis apparatus according to Embodiment 2 of the present invention.

Further optionally, as shown in FIG. 4, the calculating unit 202 further includes:

a temporal collision probability calculating subunit 202a, configured to calculate a temporal collision probability between the moving objects according to the time coordinate values corresponding to the start frames and the end frames of the moving objects;

a spatial crossover probability calculating subunit 202b, configured to calculate a spatial crossover probability between the moving tracks according to the spatial coordinate values passed by the moving tracks of the moving objects;

a spatio-temporal redundancy acquiring subunit 202c, configured to obtain the spatio-temporal redundancy of the moving tracks according to the temporal collision probability and the spatial crossover probability; and a synopsis ratio acquiring subunit 202d, configured to determine the synopsis ratio of the moving tracks according to the spatio-temporal redundancy.

The temporal collision probability calculating subunit 202a calculates the temporal collision probability between the moving objects by using the following formula:

$$Pt_{i,n}(f) = 1 - \frac{\text{lifetime of an } n^{th} \text{ object on an } i^{th} \text{ track within an } f \text{ video segment}}{\text{lifetimes of all objects on the } i^{th} \text{ track within the } f \text{ video segment}}$$

The spatial crossover probability calculating subunit 202b calculates the spatial crossover probability between the moving objects by using the following formula:

$$Pd_{i,n}(f) = \frac{\text{the number of tracks crossing an } i^{th} \text{ track within an } f \text{ video segment}}{\text{the number of tracks within the } f \text{ video segment}}$$

The spatio-temporal redundancy acquiring subunit includes:

a total spatio-temporal crossover and collision probability calculating secondary subunit, calculating a total spatio-temporal crossover and collision probability between the moving tracks by using the following formula:

$$P_{i,n}^{cross-impact}(f) = W(f) \times (Pd_{i,n}(f) + Pt_{i,n}(f)); \text{ and}$$

the spatio-temporal redundancy acquiring secondary subunit, calculating the spatio-temporal redundancy between the moving tracks by using the following formula:

$$O_{i,n}(f) = 1 - P_{i,n}^{cross-impact}(f);$$

where f indicates an $f^{th}$ video segment obtained after the original video is segmented by time or frame; $t_{i,n}$ indicates a movement time period of an $n^{th}$ moving object on an $i^{th}$ moving track within the $f^{th}$ video segment, where the $t_{i,n}$ is less than or equal to a lifetime of the $n^{th}$ moving object, and the lifetime is a time period between a time point of a start frame and a time point of an end frame of the moving object; and W(f) indicates a sensitivity adjustment function of the temporal collision probability and the spatial crossover probability.

The extracting unit 201 obtains by means of extraction the different moving objects and the moving tracks of the different moving objects from the original video, and the extracting unit 201 extracts time coordinates corresponding to time points of a start frame and an end frame of a moving object on one of the moving tracks. The calculating unit 202 obtains the temporal collision probability of the tracks according to a probability that the time coordinates, which is extracted by the extracting unit 201, corresponding to the time points of the start frame and the end frame of the moving object on one of the moving tracks overlap with time coordinates corresponding to time points of start frames and end frames of other moving objects. The temporal collision probability is a probability that a lifetime of a moving object on a moving track overlaps with lifetimes of other moving objects on the moving track, where the lifetime of the moving object is obtained according to time points of a start frame and an end frame of the moving object.

The extracting unit 201 obtains by means of extraction the different moving objects and the moving tracks of the different moving objects from the original video, and the extracting unit 201 extracts a series of spatial coordinates obtained on a track passed in space by one of the moving objects and a series of spatial coordinates obtained on tracks passed in space by other moving objects. The calculating unit 202 obtains the spatial crossover probability of the tracks according to a probability that a series of spatial coordinates, which are extracted by the calculating extracting unit 201 and obtained on the track passed in space by one of the moving objects, overlaps with a series of spatial coordinates obtained on tracks passed in space by the other moving objects. The spatial crossover probability is a probability that a moving object on a moving track crosses other moving tracks.

That is, the temporal collision probability is analyzed based on one moving track in a case in which a temporal collision occurs among multiple moving objects on the moving track. When only one moving track exists on the moving track, the temporal collision probability is zero. The spatial crossover probability is analyzed based on different moving tracks in a case in which a spatial crossover occurs among the different moving tracks. When all moving objects share one moving track, the spatial crossover probability is zero.

A spatial crossover probability and a temporal collision probability that are obtained based on a same moving object are independent of each other. The spatio-temporal redundancy acquiring subunit in the calculating unit 202 may obtain a total spatio-temporal crossover and collision probability of the moving track by combining the two independent probabilities, and may use the total spatio-temporal crossover and collision probability to estimate/acquire a relative spatio-temporal redundancy that exists between the moving track and other moving tracks, that is, a ratio of frames which can be synopsized to total frames, that is, a relative synopsis ratio of the moving track.

According to the synopsis ratio of the moving tracks that is obtained by the calculating unit 202 by calculation, rates of the moving tracks are changed, and the synopsis ratio is the ratio of the frames which can be synopsized to the total frames. Specifically, a larger spatio-temporal redundancy indicates a larger synopsis ratio of the tracks. By separately analyzing different moving tracks of moving objects to acquire different synopsis ratios of the different moving tracks, it may be implemented that rates of the different moving tracks are separately changed according to the synopsis ratios of the different moving tracks; at least a movement rate of one moving object relative to other moving objects is changed; and spatial positions and rate-changing speeds of rate-changeable moving tracks are obtained.

In a specific implementation process, changing the rates of the moving tracks may be implemented by using at least the following approaches: 1) Change an original display frame rate. That is, a display frame rate is not consistent with the original video, which may be classified into two situations: a. Increase a frame rate. That is, on a premise that the display frame rate is higher than the display frame rate of the original video, in this case, an acceleration may be performed to further increase display rates of the tracks by keeping frames of the tracks unchanged or reducing frames of a specified track; and a deceleration may be implemented by increasing the frames of the specified track; b. Reduce the frame rate. That is, on a premise that the display frame rate is lower than the display frame rate of the original video, in this case, an acceleration may be implemented by reducing the frames of the tracks; and a deceleration may be implemented by keeping the frames of the tracks unchanged or increasing frames of a specified track; 2) Keep the original display frame rate. That is, on a premise that a playback frame rate keeps consistent with the original video, an acceleration may be performed to accelerate a display rate of a specified track by reducing frames of the specified track;

and a deceleration may be performed to decelerate the display rate of the specified track by increasing the frames of the tracks.

Figure 5:
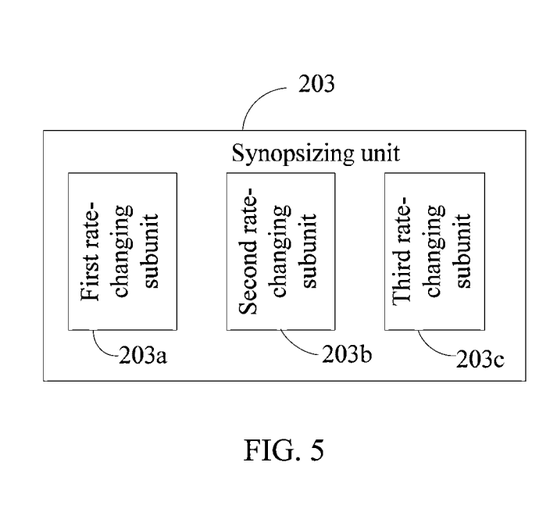
FIG. 5 is a structural block diagram of a synopsizing unit in the video synopsis apparatus according to Embodiment 2 of the present invention.

Specifically, based on the foregoing several rate-changing approaches, the synopsizing unit 203 shown in FIG. 5 may include:

a first rate-changing subunit, configured to, according to the synopsis ratio of the moving tracks, keep frames of the moving tracks unchanged and change original frame rates of the moving tracks; or a second rate-changing subunit, configured to, according to the synopsis ratio of the moving tracks, keep original frame rates of the moving tracks unchanged and reduce frames of the moving tracks; or a third rate-changing subunit, configured to, according to the synopsis ratio of the moving tracks, reduce frames of the moving tracks and change original frame rates of the moving tracks.

Further optionally, the first rate-changing subunit obtains change values of frame rates of the moving tracks according to the synopsis ratio of the moving tracks, and performs an acceleration on the moving tracks by increasing the frame rates according to the change values of the frame rates. Specifically, the synopsis ratio of the moving tracks is in direct proportion to the change values of the frame rates of the moving tracks. That is, on a basis of the original frame rates, a larger synopsis ratio indicates a larger change of the frame rate, and a smaller synopsis ratio indicates a smaller change of the frame rate. The premise is that rate changes are all accelerations based on the original frame rates, with an only difference in acceleration amplitude. The second rate-changing subunit obtains change values of the frames of the moving tracks according to the synopsis ratio of the moving tracks, and performs an acceleration by reducing the frames for the moving tracks according to the change values of the frames. Specifically, the synopsis ratio of the moving tracks is in direct proportion to the change values of the frames of the moving tracks. That is, on a basis of original frames, a larger synopsis ratio indicates a larger change of the frames, and a smaller synopsis ratio indicates a smaller change of the frames. The premise is that frame changes are all decreases based on the original frames, with an only difference in decrease amplitude. The third rate-changing subunit obtains change values of frame rates and change values of the frames of the moving tracks according to the synopsis ratio of the moving tracks, and performs an acceleration by changing the frame rates and reducing the frames of the moving tracks, according to the change values of the frame rates and the change values of the frames. Specifically, the synopsis ratio of the moving tracks is in direct proportion to the change values of the frame rates of the moving tracks, and the synopsis ratio of the moving tracks is in direct proportion to the change values of the frames of the moving tracks. That is, on a basis of the original frame rates, a larger synopsis ratio indicates a larger change of the frame rate, and a smaller synopsis ratio indicates a smaller change of the frame rate. The premise is that rate changes are all accelerations based on the original frame rates, with an only difference in acceleration amplitude. In addition, on a basis of original frames, a larger synopsis ratio indicates a larger change of the frames, and a smaller synopsis ratio indicates a smaller change of the frames. The premise is that frame changes are all decreases based on the original frames, with an only difference in decrease amplitude.

In the foregoing apparatus, optionally, the synopsizing unit 203 may further include:

a customized rate-changing subunit, configured to perform customized rate changing, by setting an area of interest, within a value range of the synopsis ratio, on a moving track in the area of interest; or an automatic rate-changing subunit, configured to change the rates of the moving tracks according to the synopsis ratio.

A user may set an area of interest in a synopsized video by using the customized rate-changing subunit. For example, in a real-life environment, a policeman may be interested in one or more objects when watching the synopsized video. In this case, to slow down a playback rate of objects of interest, customized rate changing may be performed on moving tracks of the one or more objects of interest. That is, an adjustment is performed between a display rate of the original video and a display rate of the synopsized video. In this case, other moving tracks may still be synopsized to the greatest extent according to synopsis ratios of the other moving tracks. That is, other moving objects move at a relatively fast rate. In this implementation manner, by performing a deceleration on the area of interest, the area of interest thereby acquires a better dynamic detail display effect. As described in the foregoing, specific deceleration solutions may be implemented by reducing the display frame rate or increasing the frames.

Optionally, when the user does not set the area of interest, by using the automatic rate-changing subunit, all moving tracks are synopsized according to a synopsis ratio obtained according to a corresponding spatio-temporal redundancy of the moving tracks. That is, all moving objects move at a relatively fastest rate. That is, display rates of different tracks are adjusted according to different synopsis ratios, so that on a premise that an evenness effect of spatio-temporal display is ensured, it is implemented that display time of a video synopsis result is compressed intelligently and effectively.

A spatio-temporal redundancy of moving tracks is obtained based on an overlapping probability, in time and space, of the moving tracks in this embodiment of the present invention. Therefore, synopsis ratios of different moving tracks are obtained separately, and rates of the different moving tracks are changed separately according to the different synopsis ratios, thereby reflecting different representations of the different tracks and diversifying display manners of a synopsis result. In addition, by further performing a deceleration on an object or an area that a user is interested in, the user may make a full observation, thereby ensuring information integrity of a track of an object.

What is claimed is:

1. A video synopsis method, comprising: extracting at least two moving objects and moving tracks of the at least two moving objects from an original video; obtaining a spatio-temporal redundancy between the at least two moving tracks, and determining a synopsis ratio of the moving tracks according to the spatio-temporal redundancy; and synopsizing the moving tracks of the moving objects according to the synopsis ratio of the moving tracks;

wherein the original video comprises at least one video segment, and before the obtaining the spatio-temporal redundancy between the at least two moving tracks, and determining the synopsis ratio of the moving tracks according to the spatio-temporal redundancy, the method further comprises:

acquiring, from the at least one video segment, one or more time coordinate values corresponding to time points of start frames and end frames of the moving objects, and spatial coordinate values passed by the moving tracks of the moving objects; and the obtaining the spatio-temporal redundancy between the at least two moving tracks, and determining the synopsis ratio of the moving tracks according to the spatio-temporal redundancy further comprises:

obtain a temporal collision probability between the moving objects according to the time coordinate values corresponding to the start frames and the end frames of the moving objects;

obtain a spatial crossover probability between the moving tracks according to the spatial coordinate values passed by the moving tracks of the moving objects; obtaining the spatio-temporal redundancy of the moving tracks according to the temporal collision probability and the spatial crossover probability; and determining the synopsis ratio of the moving tracks according to the spatio-temporal redundancy.

2. The method according to claim 1, wherein the method comprises:

obtaining the temporal collision probability using the following formula:

$$Pt_{i,n}(f) = 1 - \frac{\text{lifetime of an } n^{th} \text{ object on an } i^{th} \text{ track within an } f \text{ video segment}}{\text{lifetimes of all objects on the } i^{th} \text{ track within the } f \text{ video segment}}; \quad (1)$$

obtaining the spatial crossover probability using the following formula:

$$Pd_{i,n}(f) = \frac{\text{the number of tracks crossing an } i^{th} \text{ track within an } f \text{ video segment}}{\text{the number of tracks within the } f \text{ video segment}}; \quad (2)$$

obtaining a total spatio-temporal crossover and collision probability using the following formula:

$$P_{i,n}^{cross\text{-}impact}(f) = W(f) \times (Pd_{i,n}(f) + Pt_{i,n}(f)); \quad (3)$$

obtaining the spatio-temporal redundancy using the following formula:

$$O_{i,n}(f) = 1 - P_{i,n}^{cross\text{-}impact}(f); \quad (4)$$

wherein f indicates an $f^{th}$ video segment obtained after the original video is segmented by time or frame; $t_{i,n}$ indicates a movement time period of an $n^{th}$ moving object on an $i^{th}$ moving track within the $f^{th}$ video segment, wherein the $t_{i,n}$ is less than or equal to a lifetime of the $n^{th}$ moving object, and the lifetime is a time period between a time point of a start frame and a time point of an end frame of the moving object; and W(f) indicates a sensitivity adjustment function of the temporal collision probability and the spatial crossover probability.

3. The method according to claim 1, wherein the synopsizing the moving tracks of the moving objects according to the synopsis ratio of the moving tracks comprises:

keeping frames of the moving tracks unchanged and changing original frame rates of the moving tracks, according to the synopsis ratio of the moving tracks.

4. The method according to claim 3, wherein the keeping the frames of the moving tracks unchanged and changing the original frame rates of the moving tracks, according to the synopsis ratio of the moving tracks comprises:

obtaining change values of frame rates of the moving tracks according to the synopsis ratio of the moving tracks, and performing an acceleration on the moving tracks by increasing the frame rates according to the change values of the frame rates.

5. The method according to claim 3, wherein the keeping the original frame rates of the moving tracks unchanged and reducing the frames of the moving tracks, according to the synopsis ratio of the moving tracks comprises:

obtaining change values of the frames of the moving tracks according to the synopsis ratio of the moving tracks, and performing an acceleration on the moving tracks by reducing the frames according to the change values of the frames.

6. The method according to claim 5, wherein the reducing the frames of the moving tracks and changing the original frame rates of the moving tracks, according to the synopsis ratio of the moving tracks comprises:

obtaining change values of frame rates and change values of the frames of the moving tracks according to the synopsis ratio of the moving tracks, and performing an acceleration on the moving tracks by changing the frame rates and reducing the frames, according to the change values of the frame rates and the change values of the frames.

7. The method according to claim 1, wherein after the synopsizing the moving tracks of the moving objects according to the synopsis ratio of the moving tracks, the method further comprises:

setting an area of interest, and performing customized rate changing, within a value range of the synopsis ratio, on a moving track in the area of interest; or changing rates of the moving tracks of the moving objects according to the synopsis ratio.

8. The method according to claim 1, wherein the synopsizing the moving tracks of the moving objects according to the synopsis ratio of the moving tracks comprises:

keeping original frame rates of the moving tracks unchanged and reducing frames of the moving tracks, according to the synopsis ratio of the moving tracks.

9. The method according to claim 1, wherein the synopsizing the moving tracks of the moving objects according to the synopsis ratio of the moving tracks comprises:

reducing frames of the moving tracks and changing original frame rates of the moving tracks, according to the synopsis ratio of the moving tracks.

10. The method according to claim 1, wherein after the synopsizing the moving tracks of the moving objects according to the synopsis ratio of the moving tracks, the method further comprises:

changing rates of the moving tracks of the moving objects according to the synopsis ratio.

11. A video synopsis apparatus, wherein the apparatus comprises:

an extracting unit, configured to extract at least two moving objects and moving tracks of the at least two moving objects from an original video;

a calculating unit, configured to obtain a spatio-temporal redundancy between at least two moving tracks extracted by the extracting unit, and determine a synopsis ratio of the moving tracks according to the spatio-temporal redundancy; and a synopsizing unit, configured to synopsize the moving tracks of the moving objects according to the synopsis ratio of the moving tracks that is determined by the calculating unit;

wherein the original video comprises at least one video segment, and before the obtaining the spatio-temporal redundancy between the at least two moving tracks, and determining the synopsis ratio of the moving tracks according to the spatio-temporal redundancy, the the video synopsis apparatus being further configured to:

acquire, from the at least one video segment, one or more time coordinate values corresponding to time points of start frames and end frames of the moving objects, and spatial coordinate values passed by the moving tracks of the moving objects; and the obtaining the spatio-temporal redundancy between the at least two moving tracks, and determining the synopsis ratio of the moving tracks according to the spatio-temporal redundancy further comprises:

obtain a temporal collision probability between the moving objects according to the time coordinate values corresponding to the start frames and the end frames of the moving objects;

obtain a spatial crossover probability between the moving tracks according to the spatial coordinate values passed by the moving tracks of the moving objects;

obtain the spatio-temporal redundancy of the moving tracks according to the temporal collision probability and the spatial crossover probability; and determine the synopsis ratio of the moving tracks according to the spatio-temporal redundancy.

12. The apparatus according to claim 11, wherein: the extracting unit is configured to acquire time coordinate values corresponding to start frames and end frames of the moving objects and spatial coordinate values passed by the moving tracks of the moving objects; and the calculating unit further comprises:

a temporal collision probability calculating subunit, configured to obtain the temporal collision probability between the moving objects according to the time coordinate values corresponding to the start frames and the end frames of the moving objects;

a spatial crossover probability calculating subunit, configured to obtain the spatial crossover probability between the moving tracks according to the spatial coordinate values passed by the moving tracks of the moving objects;

a spatio-temporal redundancy acquiring subunit, configured to obtain the spatio-temporal redundancy of the moving tracks according to the temporal collision probability and the spatial crossover probability; and a synopsis ratio acquiring subunit, configured to determine the synopsis ratio of the moving tracks according to the spatio-temporal redundancy.

13. The apparatus according to claim 12, wherein the temporal collision probability calculating subunit obtains the temporal collision probability between the moving objects using the following formula:

$$Pt_{i,n}(f) = 1 - \frac{\text{lifetime of an } n^{th} \text{ object on an } i^{th} \text{ track within an } f \text{ video segment}}{\text{lifetimes of all objects on the } i^{th} \text{ track within the } f \text{ video segment}}; \quad (1)$$

the spatial crossover probability calculating subunit obtains the spatial crossover probability between the moving objects using the following formula:

$$Pd_{i,n}(f) = \frac{\text{the number of tracks crossing an } i^{th} \text{ track within an } f \text{ video segment}}{\text{the number of tracks within the } f \text{ video segment}}; \quad (2)$$

the spatio-temporal redundancy acquiring subunit comprises:

a total spatio-temporal crossover and collision probability calculating secondary subunit, obtaining a total spatio-temporal crossover and collision probability between the moving tracks using the following formula:

$$P_{i,n}^{cross\text{-}impact}(f) = W(f) \times (Pd_{i,n}(f) + Pt_{i,n}(f)); \quad (3)$$

the spatio-temporal redundancy acquiring secondary subunit calculating the spatio-temporal redundancy between the moving tracks using the following formula:

$$O_{i,n}(f) = 1 - P_{i,n}^{cross\text{-}impact}(f); \quad (4)$$

wherein f indicates an $f^{th}$ video segment obtained after the original video is segmented by time or frame; $t_{i,n}$ indicates a movement time period of an $n^{th}$ moving object on an $i^{th}$ moving track within the $f^{th}$ video segment, wherein the $t_{i,n}$ is less than or equal to a lifetime of the $n^{th}$ moving object, and the lifetime is a time period between a time point of a start frame and a time point of an end frame of the moving object; and W(f) indicates a sensitivity adjustment function of the temporal collision probability and the spatial crossover probability.

14. The apparatus according to claim 11, wherein the synopsizing unit comprises:

a first rate-changing subunit, configured to, according to the synopsis ratio of the moving tracks, keep frames of the moving tracks unchanged and change original frame rates of the moving tracks.

15. The apparatus according to claim 14, wherein the first rate-changing subunit is further configured to obtain change values of frame rates of the moving tracks according to the synopsis ratio of the moving tracks, and perform an acceleration on the moving tracks by increasing the frame rates according to the change values of the frame rates.

16. The apparatus according to claim 14, wherein the second rate-changing subunit is further configured to obtain change values of the frames of the moving tracks according to the synopsis ratio of the moving tracks, and perform an acceleration on the moving tracks by reducing the frames according to the change values of the frames.

17. The apparatus according to claim 16, wherein the third rate-changing subunit is further configured to obtain change values of frame rates and change values of the frames of the moving tracks according to the synopsis ratio of the moving tracks, and perform an acceleration on the moving tracks by changing the frame rates and reducing the frames, according to the change values of the frame rates and the change values of the frames.

18. The apparatus according to claim 14, wherein the synopsizing unit comprises:

a second rate-changing subunit, configured to, according to the synopsis ratio of the moving tracks, keep original frame rates of the moving tracks unchanged and reduce frames of the moving tracks.

19. The apparatus according to claim 14, wherein the synopsizing unit comprises:
a third rate-changing subunit, configured to, according to the synopsis ratio of the moving tracks, reduce frames of the moving tracks and change original frame rates of the moving tracks.

* * * * *

UNITED STATES PATENT AND TRADEMARK OFFICE
CERTIFICATE OF CORRECTION

| | | |
|---|---|---|
| PATENT NO. | : 9,454,701 B2 | Page 1 of 1 |
| APPLICATION NO. | : 14/569681 | |
| DATED | : September 27, 2016 | |
| INVENTOR(S) | : Liu et al. | |

It is certified that error appears in the above-identified patent and that said Letters Patent is hereby corrected as shown below:

In the Claims

Column 21, line 9, "according to the spatio-temporal redundancy, the the" should read
-- according to the spatio-temporal redundancy, the --.

Signed and Sealed this
Twentieth Day of December, 2016

Michelle K. Lee
*Director of the United States Patent and Trademark Office*